Aug. 22, 1950
R. R. TEETOR
2,519,859
SPEED CONTROL DEVICE FOR RESISTING
OPERATION OF THE ACCELERATOR
Filed Aug. 11, 1948
2 Sheets-Sheet 2
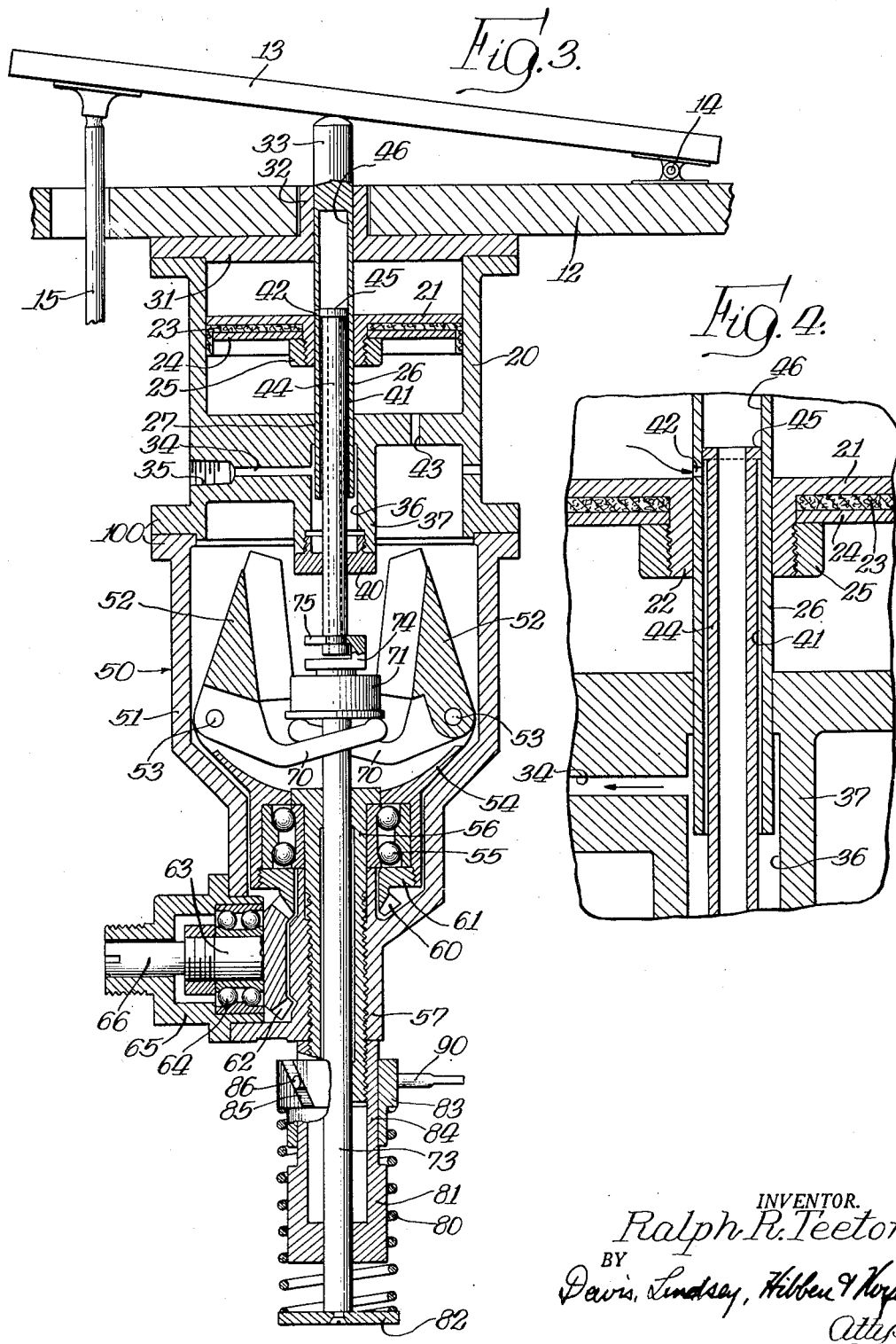
INVENTOR.
Ralph R. Teetor,
BY
Davis, Lindsey, Hibben & Noyes
Attys.

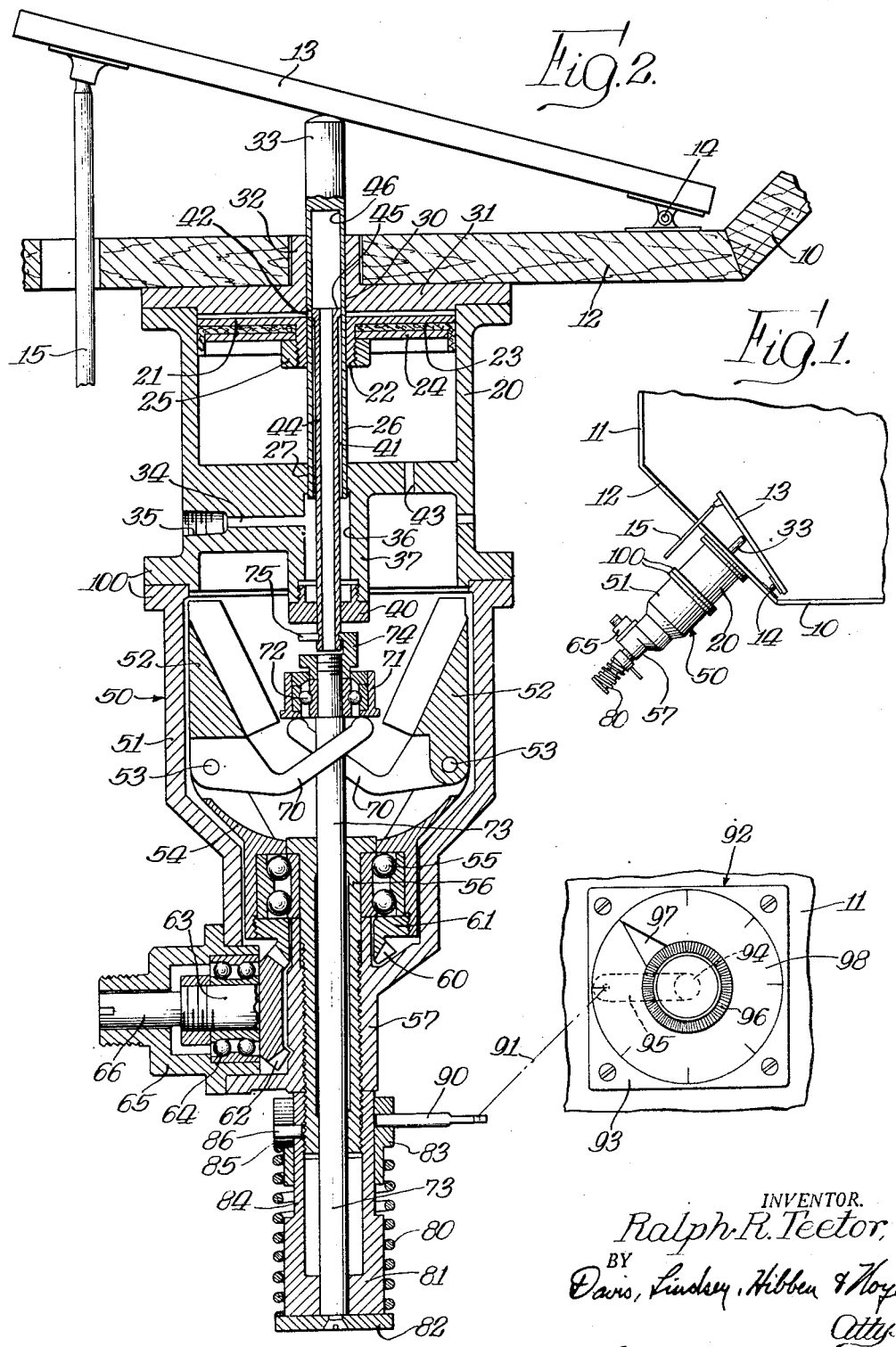

Patented Aug. 22, 1950

2,519,859

UNITED STATES PATENT OFFICE 2,519,859

SPEED CONTROL DEVICE FOR RESISTING OPERATION OF THE ACCELERATOR

Ralph R. Teetor, Hagerstown, Ind.

Application August 11, 1948, Serial No. 43,747

24 Claims. (Cl. 180—82.1)

The invention relates generally to speed control devices and more particularly to a device for assisting an automobile driver in maintaining the speed of the vehicle not in excess of a predetermined speed.

The general object of the invention is to provide a novel speed control device for a vehicle such as an automobile, which indicates to the driver through a resistance to movement of the accelerator pedal that a predetermined speed of the vehicle has been reached, the device, however, permitting movement of the pedal beyond the point at which such resistance occurs, so that such predetermined speed may be exceeded when desired.

Another important object is to provide a novel speed control device of the foregoing character, in which the predetermined speed where such resistance occurs may be readily adjusted by the driver.

A further object is to provide a speed control device of the foregoing character, which utilizes the vacuum in the intake manifold of the engine to provide the resistance, the vacuum being applied under the control of a governor operating in timed relation to the speed of the vehicle.

Still another object is to provide a speed control device of the foregoing character, which has a simple unitary construction so that it may be readily applied to an automobile, said construction being such that it may be readily serviced should the need to do so arise.

Other objects and advantages will become apparent from the following description taken in connection with the accompanying drawings, in which:

Figure 1 is a view, on a reduced scale, of a portion of an automotive vehicle provided with a device embodying the features of the invention.

Fig. 2 is a sectional view of the device shown in Fig. 1, with the parts shown in the position they occupy when the engine of the vehicle is idling.

Fig. 3 is a view similar to Fig. 2, but showing the position the parts occupy when the engine throttle is halfway open.

Fig. 4 is an enlarged fragmentary sectional view similar to Figs. 2 and 3, but illustrating more clearly the operation of the device.

Numerous types of speed governing devices have been devised for automotive vehicles, but none of them has gained any widespread use. Some of these types have provided a definite limitation on the speed of the vehicle which could not be exceeded by the driver. Such a type of governor is at least impractical and, in many situations, might be a positive hazard since, on certain occasions, it is necessary for the driver of a vehicle to exceed a desired speed to avoid an accident.

In another type of device of this general character, the vehicle is permitted to be driven at a speed in excess of that for which the governing device is set, but to accomplish this, the governing device is temporarily disabled. Another objection frequently found in governing devices is that the speed for which they are set cannot be readily adjusted. This introduces a disadvantage in that, if the governing device is set for a certain speed suitable for country driving, such speed is entirely too high for urban driving, so that the governing device is consequently inoperative during such urban driving, or if it is set properly for such urban driving, then the setting is too low for country driving.

The present device does not prohibit speeds in excess of that for which it is set, but merely offers a resistance to speed-increasing movement of the accelerator pedal or throttle control member so as to serve as a definite indication to the driver of the vehicle that the vehicle is traveling at the speed for which the device is set. The resistance is also such that it functions more or less as a rest for the operator's foot which enables him to maintain, without conscious effort, the accelerator pedal at such position as will result in the desired speed. The driver, however, is free to exceed such speed merely by pressing on the accelerator pedal sufficiently to overcome the resistance offered by the device. Thus, should he wish to pass a vehicle traveling at a slightly less speed than that which he wishes to maintain, he can exceed the speed for which his device is set long enough to pass the other vehicle and then maintain the desired speed.

The present device utilizes the vacuum occurring in the intake manifold of the vehicle engine to provide the resistance arising at the predetermined speed. However, this vacuum is utilized in such a way that, while it offers a resistance to movement of the accelerator pedal sufficient to form, in effect, a rest for the operator's foot, the operator can overcome this resistance without an excessive effort, and thereby increase the speed of the vehicle above that at which the device acts. When the operator does so increase the speed of the vehicle, the acceleration of the engine decreases the vacuum so that the resistance offered thereby is less than that occurring when the vehicle is maintained at the desired speed. The operator thus can hold the accelerator pedal in position for such excess speed without undue strain and can at any time let the speed fall back to the point at which the device is set.

The device is normally out of engagement with the accelerator pedal so that the pedal can be operated in the usual manner without the necessity of actuating any other parts through normal driving ranges. However, when the vehicle attains the speed for which the device is set, then the accelerator pedal engages a part thereof and resistance to further movement of the accelerator pedal is immediately felt by the driver. The setting of the device for any predetermined speed is readily accomplished merely by a control which may be mounted on some convenient part of the vehicle, such as on the dash. The control is of such character that it may be set to any desired speed indicated thereon, and the device will operate to provide the resistance to accelerator pedal movement when the speed is attained by the vehicle.

In Fig. 1 of the drawings, I have shown a fragmentary portion of a vehicle with the device mounted thereon. Thus, the floor of the vehicle is indicated at 10 and the dash at 11, with the two connected by a toe board 12. The accelerator pedal, here shown at 13, is usually pivotally mounted on the toe board 12, as at 14, and has secured thereto, at its free end, a movable rod 15 connected to the throttle valve (not shown) in the carburetor of the vehicle engine in the usual manner. In the present instance, merely for purposes of illustration, the device is shown as mounted directly on the toe board 12 underneath the hood of the vehicle. In the arrangement of the parts of some makes of automobiles, this space may be occupied by other parts of the car. The device may, therefore, be mounted elsewhere on the vehicle with a suitable connection extending to a point adjacent and underlying the accelerator pedal 13.

As heretofore mentioned, the device is adapted to be vacuum operated. To this end, the vacuum-operated device may be in the form of a cylinder 20 and a piston 21. In the present instance, the piston is shown as provided with a central boss 22 surrounded by a packing disc 23 held in place by a plate 24 retained on the piston by means of a nut 25 threaded on the boss 22. The piston 21 is provided with a piston rod 26 rigid with the central boss 22 and slidably mounted at one end in a central aperture 27 in the end wall of the cylinder 20, and at its other end in an aperture 30 provided in a cap 31 closing the opposite end of the cylinder 20. In the present instance, the cylinder 20 and the cap 31 are shown as being directly mounted on the toe board 12 on an axis perpendicular thereto, and the cap 31 is provided with a boss 32 extending through an aperture in the toe board. The piston rod 26 is shown as extending through the boss 32 so that it underlies the accelerator pedal 13, the outer end of the piston rod, indicated at 33, constituting a stop member engageable by the accelerator pedal. If the device is mounted elsewhere in the vehicle than directly on the toe board 12, then the outer end of the piston rod, of course, will be connected through suitable levers and links, depending upon its location, to a stop member mounted under the accelerator pedal in the same position as the outer end portion 33. Thus, both in this description and in the claims, where it is recited that the stop member is connected to the piston rod, such recitation is intended to cover either the present form where the stop member 33 is integral with the piston rod 26, or a form in which the stop member 33 is connected through intermediate levers or links with the piston rod.

The vacuum cylinder 20 is preferably connected with the intake manifold of the vehicle engine as a source of vacuum. Thus, the cylinder 20, at its closed end, is provided with a radial passage 34 threaded at its outer end, as at 35, for a tube or pipe to connect the passage 34 with the intake manifold. At the inner end, the radial passage 34 opens into a centrally positioned chamber 36 constituting an enlargement of the aperture 27 in which the piston rod 26 reciprocates. In its preferred form, the chamber 36 is formed in a hub 37 extending from the end wall of the cylinder, and its diameter is greater than the diameter of the piston rod 26. The length of the chamber 36 is such that the piston rod 26 may freely reciprocate therein without contacting the closed end of the chamber, such closed end being provided by a plug 40 in the present instance.

The piston rod 26 is of tubular form for a major portion of its length to provide an internal passage 41 having a radially extending aperture 42 adjacent the operating face of the piston 21, that is, adjacent the face of the piston toward the cap 31. With this arrangement, when vacuum is to be applied to the cylinder 20, communication from the space between the piston 21 and the cap 31 is provided by the aperture 42, the internal passage 41, the chamber 36, and the radial passage 34. The internal passage 41 is constantly subjected to such vacuum since the length of the chamber 36 is great enough to maintain the passage 41 constantly in communication with the radial passage 34.

The piston is adapted to be moved downwardly, as shown in Figs. 2, 3 and 4, by engagement of the accelerator pedal 13 with the stop member 33. During such movement, air in the lower end of the cylinder 20 under the piston 21 may be discharged therefrom through a vent 43 in the lower end wall of the piston 20. When vacuum is applied to the cylinder above the piston 21 through the radial passage 34, chamber 36, internal passage 41 and radial aperture 42 in the piston rod, resistance will thereby be offered to further downward movement of the piston by the accelerator pedal 13.

The application of vacuum to the cylinder, through the path just described, is controlled jointly by the position of the piston rod 26 and a valve plunger 44. The valve plunger 44 is arranged so that, under normal circumstances, atmospheric air is admitted to the cylinder 20 above the piston 21. Under such circumstances, the piston will offer no resistance to movement of the stop member 33 and the accelerator pedal 13. However, when the predetermined vehicle speed at which the device is set is reached, then the valve plunger 44 and piston rod 26 are so positioned that the vacuum will be applied to the cylinder. To this end, the valve plunger 44 has a diameter less than the diameter of the internal passage 41 to leave an annular space therein. At its inner end, the plunger 44 is provided with a collar 45 snugly fitting within the internal passage 41. Thus, the annular space in the internal passage 41 below the collar 45 will be subjected to vacuum. The space in the internal passage 41 above the collar 45 is adapted to be connected to the outside atmosphere. To this end, the plunger 44 is tubular in form throughout its length and extends through the plug 40 so that air at atmospheric pressure is admitted to the upper portion, indicated at 46, of the internal passage 41 above the collar 45. By shifting the plunger 44, the collar 45 may be moved across the radial aperture 42 in the piston rod 26 to connect the aperture with the spaces on opposite sides of the collar 45 or, in other words, to connect the aperture 42 with the vacuum or with atmospheric air.

During normal operation of the vehicle at speeds below that for which the device is set, the collar 45 lies below the aperture 42 so that atmospheric air may enter the cylinder 20 above the piston 21 through the radial aperture 42 to permit free movement of the piston 21 by the stop member 33. However, when the valve plunger 44 is shifted to a point where the collar 45 is above the radial aperture 42, vacuum will be applied to the cylinder 20 through the annular space surrounding the valve plunger 44, and a resistance will be offered to movement of the stop member 33 by the accelerator pedal. Such movement of the accelerator pedal, of course, is in a direction to increase the speed of the vehicle.

The valve plunger 44 is under the control of a governor, indicated generally at 50, responsive to the speed of the vehicle. The governor in the present instance is of the centrifugal weight type and comprises a casing 51 rigidly secured to the cylinder 20, coaxially therewith. Within the casing 51 is a pair of weights 52 pivotally supported at 53 by a rotatably driven carrier 54. The carrier 54 is supported on an anti-friction bearing 55 mounted on a hub member 56 threaded in a reduced end portion 57 of the governor casing 51. The carrier 54 is adapted to be rotatably driven by means of a bevel gear 60 having a flange 61 threaded in the outer end of the carrier 54. The bevel gear 60 meshes with a second bevel gear 62 having a hub 63 journaled in an anti-friction bearing 64 carried by a cap 65 secured in the reduced portion 57. The hub 63 of the second bevel gear 62 is rigidly secured to a stub shaft 66 which may be connected to and driven by the speedometer cable of the vehicle. Thus, the carrier 54 will be driven in timed relation with the vehicle so that the action of the weights 52 will be responsive to the vehicle speed.

The weights 52 are adapted to move the valve plunger 44 upwardly or inwardly as the speed of the vehicle increases. To this end, each of the weights is provided with an inwardly extending arm 70 bearing against a collar 71 supported on an anti-friction bearing 72 on the end of a rod 73. The rod 73 is axially aligned with the valve plunger 44 and is adapted to be connected thereto to effect endwise movement of the valve plunger. For this purpose, the upper end of the rod 73 is provided with a U-shaped clip 74 threaded on the end of a rod 73 and radially slotted as at 75 to fit within a groove formed in the end of the valve plunger 44. Thus, as the centrifugal weights 52 move outwardly when rotatably driven, the arms 70 thereof will tend to move the collar 71 upwardly to shift the valve plunger 44 upwardly.

The outward movement of the weights 52 under centrifugal action is opposed, in the present instance, by a coiled spring 80. The coiled spring 80 extends about a cylindrical cap 81 threaded on the outer end of the hub member 56, the latter extending beyond the reduced portion 57 of the governor casing 51 for this purpose. The rod 73 is slidably mounted in the hub member 56 and extends at its outer end beyond the cap 81. On the outer end of the rod 73 is secured a plate 82 forming a seat for the outer end of the spring 80. The inner end of the spring 80 bears against a collar 83 slidably and rotatably mounted on a reduced portion 84 of the cap 81. The spring 80 thus tends to force the rod 73 downwardly against the action of the centrifugal weights 52.

The present device provides for adjustment of the speed at which resistance is offered to movement of the accelerator pedal 13 to increase the speed. In the present instance, such adjustment is accomplished by varying the pressure exerted by the spring 80 against the action of the centrifugal weights 52. By increasing the pressure exerted by the spring, the weights 52 will swing outwardly a lesser amount for a given speed and, consequently, the valve plunger 44 will be moved upwardly to a lesser extent. Thus, vacuum will not be permitted to be applied to the cylinder until the piston 21 is moved to a lower point by depression of the accelerator pedal 13.

In the illustrative arrangement shown in the drawings, the pressure of the spring 80 may be varied by adjusting the position of the collar 83 on the reduced portion 84 of the cap 81. To this end, the collar 83 is provided with an angularly positioned cam slot 85. Within the cam slot 85 is a pin 86 mounted in and extending radially from the reduced portion 84 of the cap 81. It will be obvious that with this arrangement, the collar 83 may be shifted axially to vary the pressure of the spring 80, by rotating the collar relative to the cap 81 and the pin 86.

Such adjustment of the pressure of the spring 80 is preferably arranged so that the adjustment may be made by the driver at any time he desires to do so. Preferably, the control for such adjustment is mounted on the dash 11 of the vehicle. To effect the adjustment, a radially extending arm 90 is mounted in the collar 83 and a flexible connection 91, such as a Bowden wire, is attached to the arm 90 and extends to a control, indicated generally at 92, mounted on the dash 11. The control 92 may have any suitable form, but for purposes of illustration, it is shown as comprising a base plate 93 mounted on the dash 11 and carrying a rotatably mounted shaft 94. The shaft 94 may extend through the dash and, under the hood of the car, carries a lever arm 95 to which the flexible connection 91 is attached. On the other end of the shaft 94 is mounted an operating knob 96 and a pointer 97, the knob 96, of course, being utilized for manually rotating the shaft 94. The pointer 97 is adapted to coact with a dial 98 mounted on the base 93 and carrying indicia for the different speeds to which the device is adapted to be set.

Fig. 2 shows the position of the parts which they occupy when the pointer 97 is set for idling speed and the accelerator pedal 13 is released so that the engine will run at such speed. Of course, in the use of the device, the pointer 97 would never be set in such position since there would be no purpose in utilizing the present device to limit the speed of the vehicle in this way. Such speed may be maintained, of course, merely by removing the foot from the accelerator pedal. However, the position of the parts is shown in the drawings for this speed to illustrate the maximum range of movement thereof.

Fig. 3 illustrates the position of the parts when the device is set for a speed intermediate idling and maximum speeds. For such setting of the device, the pointer 97 will be turned to the corresponding indicia on the dial 98. Such adjustment of the pointer effects rotation of the collar 83 and, through the action of the cam slot 85 and pin 86, the pressure of the spring is increased. This pressure is exerted on the rod 73 so that the collar 71 is thereby drawn downwardly, as shown in Fig. 3, to cause the weights 52 to be moved to an inward position. Likewise, the plunger 44 is moved downwardly.

Assuming that the vehicle has been running at an idling speed, the accelerator pedal 13 is depressed to increase the speed of the vehicle. This in turn depresses the stop member 33 to move the piston 21 downwardly in the cylinder 20. Only slight frictional resistance is offered by such movement of the piston against the movement of the accelerator pedal 13, since the air in the lower end of the cylinder 20 can be forced out readily through the vent 43. Since the valve plunger 44 has been moved down by the adjustment of the spring pressure, the radial aperture 42 in the piston rod, during the first part of the downward movement thereof, is positioned above the collar 45 on the valve plunger 44 so that air is freely admitted to the upper end of the cylinder 20 through the interior of the valve plunger 44 and into the upper portion 46 of the internal passage in the piston rod. From such passage the air is free to pass through the radial aperture 42 into the upper end of the cylinder.

Such conditions exist until the stop member 33 is depressed sufficiently to move the aperture 42 in line with the collar 45 to be closed thereby. Thus, for any speed of the vehicle resulting from depression of the accelerator pedal 13 to this point, the accelerator pedal may be freely moved as in normal operation of the vehicle. While there is the slight friction of the piston 21 acting against the depression of the accelerator pedal 13 during the first depression of the latter, if the accelerator pedal 13 is depressed to this point and then partially released, the stop member 33 will remain in position without following the retractive movement of the accelerator pedal 13. Consequently, thereafter for all movements of the accelerator pedal 13 below the speed for which the device is set, no resistance whatever is offered to movement of the pedal so that it is free to be moved in a normal manner without any interference from the present device.

Now, for the same setting of the pointer 97 with the resultant setting of the valve plunger 44, let it be assumed that the accelerator pedal 13 is depressed sufficiently to result in a vehicle speed above that for which the pointer 97 is set. Such depression of the accelerator pedal 13, acting through the stop member 33, moves the piston 21 and piston rod 26 downwardly. At the same time, the increasing speed of the vehicle causes the centrifugal weights 52 to move outwardly to a greater extent against the action of the spring 80 and the valve plunger 44 is thereby raised. Because of such movements, a point will be reached at which the radial aperture 42 in the piston rod 26 and the collar 45 on the valve plunger 44 cross each other so that communication will be established, through the aperture 42, between the upper end of the cylinder 20 and the annular space formed by the internal passage 41 in the piston rod and the valve plunger 44. This space communicates with the intake manifold as heretofore described, so that vacuum will thereby be applied to the upper end of the cylinder, tending to draw the piston 21 upwardly and offering a definite resistance to speed increasing movement of the accelerator pedal 13.

The driver of the vehicle, under such circumstances, will release the accelerator pedal 13 sufficiently to permit the piston rod 26 and stop member 33 to rise until the radial aperture 42 and collar 45 are aligned, thus closing communication from the source of vacuum to the upper end of the cylinder 20. At this point, there is no longer any tendency of the piston 21 to move upwardly and the driver may easily hold the accelerator pedal in this position against the stop member 33 since any slight depression of the pedal results in resistance due to the vacuum. The device, therefore, functions as a rest for the driver's foot, enabling him to maintain a desired speed without having to watch his speedometer. If, under such circumstances, the vehicle should encounter a slight upgrade, causing it to slow down slightly, the weights 52 will move inwardly thereby lowering the valve plunger 44 and the collar 45 so that the operator will be able to depress the accelerator pedal 13 sufficiently to bring the aperture 42 and collar 45 in aligned position. As a result of this, the same speed may be maintained on the upgrade as for level travel. If the vehicle encounters a slight downgrade during such operation, the slight increase in speed thereof will cause the weight 52 to move outwardly, elevating the valve plunger 44 and the collar 45 to shift the collar 45 above the aperture 42 and apply vacuum to the cylinder. The operator can then release the accelerator pedal 13 sufficiently to move the aperture up to alignment with the collar and maintain the same speed on the downgrade.

Should the driver be holding the vehicle at such a set speed and approach another vehicle ahead of him traveling at a slightly less speed than the driver wishes to maintain, and should the driver desire to pass such vehicle, the present device is such that the accelerator pedal 13 may be depressed sufficiently to increase the vehicle speed the desired amount. The resistance offered by the vacuum when applied to the upper end of the cylinder is not so great but that the driver can readily depress the accelerator pedal against such resistance. Thus, such further depression of the accelerator pedal will move the piston downwardly and the resultant increase in speed of the vehicle will result in raising the valve plunger 44 so that the radial aperture 42 will be positioned below the collar 45 and vacuum will be applied to the cylinder. The maximum resistance resulting from such application of the vacuum to the cylinder will, however, only be momentary since acceleration of the engine will cause a decrease in vacuum in the intake manifold, thus lowering the resistance offered to downward movement of the piston 21 under such circumstances. As soon as the driver has passed the other vehicle, he may reassume his desired speed merely by permitting the accelerator pedal to elevate. This results in a decrease in vehicle speed and a consequent lowering of the valve plunger 44 and the collar 45 so that the previous position thereof, as well as the position of the radial aperture 42, is reassumed by these parts to permit the driver to maintain his selected speed.

The pointer 97, of course, may be set for any speed within the maximum range of the vehicle and the same action of the parts takes place at such adjusted setting. The position of the valve plunger and the piston will, of course, vary with the setting of the pointer 97, but their positions relative to each other to accomplish the actions heretofore described will be the same.

The device, it will be noted, is of a simple construction since the operating portion thereof constitutes a unit. Such unit comprises the vacuum cylinder section 20 with its cooperating piston, piston rod and valve plunger, and the governor section 50 mounted on the cylinder section in axial alignment therewith. The governor section 50 is readily detachable from the cylinder section since the two are provided with abutting flanges 100 which may be secured together as by bolts. The clip 74 permits a quickly detachable connection between the rod 73 and the valve plunger 44 so that, if any servicing of the device is required, the two sections may be readily separated.

I claim:

1. In an automotive vehicle having a driver-operated throttle control member, a shiftable stop member positioned in the path of movement of said control member, a piston and cylinder device connected to said stop member and communicating with the intake manifold of the vehicle engine to subject such device to the vacuum therein, a valve dependent upon the position of the piston for controlling the application of vacuum to said device, and a governor operated in timed relation to the speed of the vehicle for controlling said valve.

2. In automotive vehicle having a driver-operated throttle control member, a shiftable stop member positioned in the path of movement of said control member, a piston and cylinder device connected to said stop member and communicating with the intake manifold of the vehicle engine to subject such device to the vacuum therein, said device resisting shifting movement of said stop member when vacuum is applied to said device, a valve interposed between said device and the manifold and dependent upon the position of the piston to control the application of vacuum to the device, and a governor operated by the vehicle for operating said valve to apply the vacuum to said device at a predetermined vehicle speed.

3. In an automotive vehicle having a driver-operated throttle control member, a stop member positioned in the path of said control member and movable by said control member when engaged thereby, a vacuum-operated device connected to said stop member for movement thereby and communicating with the intake manifold of the vehicle engine and adapted to offer resistance to movement of said stop member when the vacuum in the manifold is applied thereto, and a governor-controlled valve dependent upon the movement of said device for determining the point in the movement of said stop member when vacuum is applied to said device.

4. In an automotive vehicle having a driver-operated throttle control member, a stop member positioned in the path of said control member and movable by said control member when engaged thereby, a vacuum-operated device connected to said stop member and adapted to offer resistance to movement of said stop member when vacuum is applied to said device, said device having a part movable with said stop member and communicating with the intake manifold of the vehicle engine, and a governor-controlled member dependent upon the position of said part to apply the vacuum in the manifold to said device at a predetermined vehicle speed.

5. In an automotive vehicle having a driver-operated throttle control member, a stop member positioned in the path of said control member and movable by said control member when engaged thereby, a vacuum-operated device connected to said stop member for offering resistance to movement thereof by said control member when vacuum is applied to said device, and a pair of relatively shiftable parts for controlling the application of vacuum from the intake manifold of the vehicle engine to said device, one of said parts being shiftable with said stop member, and a governor responsive to the vehicle speed for shifting the other of said parts.

6. In an automotive vehicle having a driver-operated throttle control member, a stop member positioned in the path of said control member and movable by the speed-increasing movement of said control member, a vacuum cylinder having a piston with a piston rod connected to said stop member and tending to resist the speed-increasing movement of said control member when vacuum is applied to said cylinder, said piston rod having a passage connected to the intake manifold of the vehicle engine and opening into the cylinder for applying the vacuum in the manifold to said cylinder, a governor responsive to the vehicle speed, and a plunger mounted in said passage for controlling the application of vacuum to said cylinder, said plunger being shiftable by said governor and being adapted to apply the vacuum at a predetermined vehicle speed.

7. In an automotive vehicle having a driver-operated throttle control member, a stop member positioned in the path of said control member and movable by said control member when the latter is moved to increase the speed of the vehicle, a vacuum cylinder, a piston having a piston rod connected to said stop member with the piston tending to resist the speed-increasing movement of said control member when vacuum is applied to the cylinder, said piston rod being tubular and having a lateral aperture opening into the cylinder and being in communication at one end with the intake manifold of the vehicle engine and the vacuum therein and at the other end with the atmosphere, a plunger extending into one end of said piston rod in radially spaced relation thereto and having a flange at its inner end fitting snugly within the piston rod and adapted on shifting movement to connect said aperture with one or the other end of the piston rod to subject the piston to vacuum or to the atmosphere, and a governor responsive to the vehicle speed and connected to said plunger whereby vacuum will be applied to the cylinder at a predetermined vehicle speed.

8. In an automotive vehicle having a driver-operated throttle control member, a stop member positioned in the path of said control member and movable by said control member when the latter is moved to increase the speed of the vehicle, a vacuum cylinder, a piston having a piston rod connected at one end to said stop member with the piston tending to resist the speed-increasing movement of the control member when vacuum is applied to the cylinder, said piston rod having an axial passage extending from the other end thereof to a point beyond the piston and having a lateral aperture opening into the cylinder beyond said piston, said passage at said other end communicating with the intake manifold of the vehicle engine to apply the vacuum therein to the cylinder, a tubular plunger extending into said passage through said other end and being of smaller diameter than said passage, the outer end of said plunger being open to the atmosphere and the inner end having a flange fitting snugly in said passage, and a governor responsive to the vehicle speed connected to said plunger for moving it axially in said passage, said flange normally lying between said aperture and said other end to connect the cylinder with the atmosphere and being shiftable at a predetermined vehicle speed to the other side of said aperture by the combined effect of the movement of the plunger effected by the governor and the movement of the piston rod by the control member.

9. In an automotive vehicle having a driver-operated throttle control member, a vacuum cylinder, a piston in said cylinder tending to move in one direction when vacuum is applied to said cylinder, a stop member engageable by said control member for moving the piston in the opposite direction when the control member is moved to increase the speed of the vehicle, a governor responsive to the vehicle speed, and valve means for applying vacuum to said cylinder at a predetermined vehicle speed comprising a pair of elements movable relative to each other, one element being movable by the governor and the other element being movable by the piston.

10. In an automotive vehicle having a driver-operated throttle control member, a vacuum cylinder, a piston in said cylinder tending to move in one direction when vacuum is applied to said cylinder, a stop member engageable by said control member for moving the piston in the opposite direction when the control member is moved to increase the speed of the vehicle, a governor responsive to the vehicle speed, a connection between said cylinder and the intake manifold of the vehicle engine, and a pair of oppositely shiftable elements jointly controlling the application of the vacuum in said manifold to said cylinder, one of said elements being shiftable by the governor and the other being shiftable by the movement of the piston.

11. In an automotive vehicle having a driver-operated throttle control member, a vacuum cylinder, a piston in said cylinder tending to move in one direction when vacuum is applied to said cylinder, a stop member engageable by said control member for moving the piston in the opposite direction when the control member is moved to increase the speed of the vehicle, a governor responsive to the vehicle speed, a connection between said cylinder and the intake manifold of the vehicle engine, and a pair of oppositely shiftable elements jointly controlling the application of the vacuum in said manifold to said cylinder, one of said elements comprising a piston rod connecting said piston and said stop member and consequently shiftable therewith, and the other element being in telescopic relation with the piston rod and being shiftable by the governor.

12. In an automotive vehicle having a driver-operated throttle control member, a vacuum cylinder, a piston in said cylinder tending to move in one direction when vacuum is applied to said cylinder, a stop member engageable by said control member for moving the piston in the opposite direction when the control member is moved to increase the speed of the vehicle, a governor responsive to the vehicle speed, and a pair of shiftable valve elements respectively shifted by the governor and the piston and jointly operable to apply vacuum to the cylinder when said control member is shifted to a position to cause the vehicle to exceed a predetermined speed, said elements admitting atmospheric air to the cylinder when either said control member or said governor is shifted to a position for a speed less than said predetermined speed.

13. In an automotive vehicle having a driver-operated throttle control member, a vacuum cylinder, a piston in said cylinder movable in one direction in response to movement of said control member in a direction to increase the speed of the vehicle and tending to move in the opposite direction when vacuum is applied to said cylinder, a governor responsive to the vehicle speed, and a pair of shiftable valve elements respectively movable by the piston and the governor and jointly controlling the application of vacuum to said cylinder, said elements applying vacuum to the cylinder only when the governor indicates a speed above a predetermined speed and the piston is at a position corresponding to a position for said control member above that at which said predetermined speed is attained.

14. In an automotive vehicle having a driver-operated throttle control member, a vacuum cylinder, a piston in said cylinder movable in one direction in response to movement of said control member in a direction to increase the speed of the vehicle and tending to move in the opposite direction when vacuum is applied to said cylinder, a governor responsive to the vehicle speed, and a pair of shiftable valve elements respectively movable by the piston and the governor and jointly controlling the application of vacuum to said cylinder, one of said elements having an aperture communicating with the cylinder and the other of said elements having spaces on opposite sides thereof respectively connected to a vacuum and to the atmosphere and being shiftable across said aperture to alternately connect said aperture with said spaces.

15. In an automotive vehicle having a driver-operated throttle control member, a vacuum cylinder, a piston in said cylinder movable in one direction in response to movement of said control member in a direction to increase the speed of the vehicle and tending to move in the opposite direction when vacuum is applied to said cylinder, a governor responsive to the vehicle speed, and a pair of shiftable valve elements respectively movable by the piston and the governor and jointly controlling the application of vacuum to said cylinder, said governor having means for adjusting the effect thereof on its associated valve element whereby the vehicle speed at which vacuum is applied to said cylinder may be varied.

16. In an automotive vehicle having a driver-operated throttle control member, a vacuum cylinder, a piston in said cylinder movable in one direction in response to movement of said control member in a direction to increase the speed of the vehicle and tending to move in the opposite direction when vacuum is applied to said cylinder, a governor responsive to the vehicle speed, and a pair of shiftable valve elements respectively movable by the piston and the governor and jointly controlling the application of vacuum to said cylinder, said governor comprising an actuator for the associated valve element shiftable in accordance with the vehicle speed, and a spring device opposing the action of said actuator on said valve element, said spring device being adjustable to vary the speed at which vacuum is applied to said cylinder.

17. In an automotive vehicle having a driver-operated throttle control member, a vacuum cylinder, a piston in said cylinder movable in one direction in response to movement of said control member in a direction to increase the speed of the vehicle and tending to move in the opposite direction when vacuum is applied to said cylinder, a governor responsive to the vehicle speed, and a pair of shiftable valve elements respectively movable by the piston and the governor and jointly controlling the application of vacuum to said cylinder, said governor comprising a centrifugally operating weight device tending to move the associated valve element in one direction, a spring tending to move said valve element in the opposite direction, and means for adjusting the pressure of the spring to vary the speed at which vacuum is applied to said cylinder.

18. In an automotive vehicle having a driver-operated throttle control member, a vacuum cylinder, a piston in said cylinder movable in one direction in response to movement of said control member in a direction to increase the speed of the vehicle and tending to move in the opposite direction when vacuum is applied to said cylinder, a governor responsive to the vehicle speed, and a pair of shiftable valve elements respectively movable by the piston and the governor and jointly controlling the application of vacuum to said cylinder, said governor including a spring adjustable to vary its pressure to vary the action of the governor on its associated valve element whereby the vehicle speed at which vacuum is applied to said cylinder may be varied, and a remote control for adjusting said spring.

19. In an automotive vehicle having a driver-operated throttle control member, a device for providing resistance at a predetermined vehicle speed to speed-increasing movement of said control member comprising a stop member positioned in the path of movement of said control member and engageable thereby, a vacuum cylinder mounted on a fixed portion of the vehicle and having a connection with the intake manifold of the vehicle engine, said cylinder having a piston connected to said stop member and adapted to resist movement of said stop member when vacuum from the manifold is applied to the cylinder, a governor carried by said cylinder and having a drive responsive to the vehicle speed, and a valve plunger actuated by and extending from the governor and extending into the cylinder for controlling the application of vacuum to said cylinder.

20. In an automotive vehicle having a driver-operated throttle control member, a device for providing resistance at a predetermined vehicle speed to speed-increasing movement of said control member comprising a stop member positioned in the path of movement of said control member and engageable thereby, and a vacuum cylinder mounted on a fixed portion of the vehicle and having a connection with the intake manifold of the vehicle engine, said cylinder having a piston connected to said stop member and adapted to resist movement of said stop member when vacuum from the manifold is applied to the cylinder, a governor mounted on said cylinder coaxially therewith and having a drive connection responsive to the vehicle speed, and a valve plunger extending from the governor axially into the cylinder for controlling the application of the vacuum thereto.

21. In an automotive vehicle having a driver-operated throttle control member, a device for providing resistance at predetermined vehicle speed to speed-increasing movement of said control member comprising a stop member positioned in the path of movement of said control member and engageable thereby, and an operating unit comprising a vacuum cylinder having one end mounted on a fixed portion of the vehicle and having a connection with the intake manifold of the vehicle engine, said cylinder having a piston connected to said stop member and adapted to resist movement thereof when vacuum from the manifold is applied to the cylinder, a governor mounted on the other end of the cylinder coaxially therewith and having a drive connection responsive to the vehicle speed, a valve plunger extending axially between said governor and said cylinder and actuated by the governor for controlling the application of vacuum to said cylinder, an adjustable spring mounted on said governor remote from said cylinder and in axial alignment with the governor and cylinder for modifying the action of the governor on said plunger, and an adjusting device adapted to be mounted on the vehicle dash for adjusting said spring.

22. In an automotive vehicle having a driver-operated throttle control member, a device for providing resistance at a predetermined vehicle speed to speed-increasing movement of said control member comprising a stop member positioned in the path of movement of said control member and engageable thereby, and an operating unit comprising a vacuum cylinder section mounted on a fixed portion of the vehicle and having a connection with the intake manifold of the vehicle engine, said cylinder having a piston connected to said stop member, and a valve plunger extending from one end of said cylinder section and adapted to control the application of vacuum to said cylinder, and a governor section detachably secured to said end of the cylinder section and having a drive connection responsive to the vehicle speed, the governor having a connection with said valve plunger to control the application of vacuum to the cylinder.

23. In an automotive vehicle having a driver-operated throttle control member, a vacuum-operated device having an element movable in one direction in response to movement of said control member in a direction to increase the speed of the vehicle and tending to move in the opposite direction when vacuum is applied to said device, a governor responsive to vehicle speed, and valve mechanism for controlling the application of vacuum to said device comprising a pair of members respectively operable by the governor and said movable element and cooperating to apply the vacuum to said device.

24. In an automotive vehicle having a driver-operated throttle control member, a vacuum-operated device having a connection with the intake manifold of the vehicle engine and an element movable in one direction in response to movement of said control member in a direction to increase the speed of the vehicle and adapted to offer resistance proportional to the vacuum in the manifold to such movement when vacuum from the manifold is applied to said device, a governor responsive to vehicle speed, and valve mechanism for controlling the application of vacuum to said device comprising a pair of members respectively operable by the governor and said movable element and cooperating to apply the vacuum to said device to offer resistance to movement of said element at a predetermined vehicle speed, said control member being movable against said resistance to accelerate the vehicle above said predetermined speed, thereby decreasing the vacuum to lessen the resistance.

RALPH R. TEETOR.

REFERENCES CITED

The following references are of record in the file of this patent:

UNITED STATES PATENTS

| Number | Name | Date |
|---|---|---|
| 2,077,555 | Frantz | Apr. 20, 1937 |